3,222,125
DISSOLUTION OF NUCLEAR ALUMINUM-BASE FUEL

Wallace W. Schulz, Richland, Wash., assignor to the United States of America as represented by the United States Atomic Energy Commission
No Drawing. Filed Sept. 17, 1964, Ser. No. 397,347
2 Claims. (Cl. 23—14.5)

The invention described herein was made in the course of, or under, a contract with the United States Atomic Energy Commission.

This invention relates to a process of dissolving nuclear aluminum-base fuel such as plutonium-aluminum, uranium-aluminum and plutonium-nickel-aluminum alloys. Dissolution of irradiated or "spent" nuclear fuel is necessary for the recovery of the various actinides and fission products, for instance by the Redox solvent extraction process.

Fuel elements or materials of the type just described have been dissolved heretofore in boiling nitric acid containing mercuric ion catalyst. For example, nitric acid of a concentration of between 3 and 4 M and 0.002 M in mercuric nitrate or in other instances 6 to 8 M nitric acid containing 0.005 M mercuric nitrate plus 0.03 M ammonium fluoride have been successfully used for the dissolution of aluminum-base fuel elements.

However, these nitric acid-mercuric nitrate mixtures were found satisfactory only for the dissolution of fuel that had not been bombarded with neutrons, but were found very unsatisfactory for neutron-bombarded fuel and in particular for fuel that had experienced a burnup of about 20% and above. In the case of irradiated fuel, very little surface roughening or "activation" occurred, and the dissolution was extremely slow.

It is an object of this invention to provide a process for the fast activation and dissolution of aluminum-base fuel and in particular of neutron-bombarded fuel.

It is another object of this invention to provide a process for the dissolution of neutron-bombarded fuel in which the off-gas contains a lesser quantity of hydrogen than was the case with the processes used heretofore, so that the explosion hazard is reduced considerably and often to zero.

It was found that, when an essentially lower nitric acid concentration was used in conjunction with the mercuric ion catalyst, a prompt activation occurred even with neutron-bombarded aluminum-base fuel and that the nitric acid concentration for this purpose had to be as low as about 1 M. After the activation had set in, the concentration of the nitric acid could then be increased to the level used heretofore, namely to between 4 and 6 M, to accelerate dissolution proper.

The process of this invention thus comprises immersing aluminum-base nuclear fuel in a boiling aqueous nitric acid solution containing nitric acid in a concentration of about 1 M and mercuric ions in a very small, catalytic amount, maintaining the fuel in said solution until activation has set in, which is indicated by a grey to black surface color, and then adding concentrated nitric acid at boiling temperature in a quantity to obtain a concentration of between 4 and 6 M, whereupon dissolution takes place at a fast rate.

If the fuel to be treated is clad, for instance with Zircaloy, and encased in a shipping container which usually is of aluminum, both of these materials have to be removed prior to the use of the process of this invention. Since the processes for both steps are known in the art and not part of this invention, details will not be given here. However, it is well to point out that the shipping container can be removed by mechanical means as well as by dissolution in sodium hydroxide-sodium nitrate solutions and that the Zircaloy cladding can be removed by treatment with an ammonium fluoride-ammonium nitrate solution.

As has been stated, the nitric acid concentration should be approximately 1 M for the activation step. A concentration of between 0.8 and 1.2 M has been found satisfactory. While for the mercuric ion catalyst any water-soluble salt can be used, mercuric nitrate was the preferred salt; its concentration may range between 0.003 M and 0.015 M.

Once the activation has started and the surface has assumed a greyish color, the concentrated nitric acid necessary to bring the concentration to between 4 and 6 M is added. This should be done rather promptly, because if a time lapse is allowed to occur between the activation step and the addition of the concentrated nitric acid for the dissolution proper, a greater percentage of hydrogen gas will be present in the off-gas and an explosion hazard will exist. For instance, when the concentrated acid was added 15 minutes after activation had been started with a mixture 1 M in nitric acid and 0.003 M in mercuric nitrate, the off-gas contained about 2.35% of hydrogen by volume. When, on the other hand, the concentrated nitric acid was admixed immediately after the activation had set in, the hydrogen content of the off-gas was only 0.64% by volume. The nitric acid to be added for the second, dissolution, step may be 12 M or higher.

The temperature best used for both steps is boiling temperature. However, the reaction does start at between 60 and 70° C.

Two parallel experiments were carried out with boiling nitric acid of a concentration of 3.5 M and containing mercuric nitrate in a concentration of 0.003 M, one using the one-step procedure as it had been customary heretofore and the other one using the two-step procedure of this invention; in the latter procedure 1 M nitric acid containing 0.003 M mercuric nitrate was first used for activation and thereupon 12 M nitric acid was promptly added. While the dissolution in the customary process required 65 hours, the process of this invention accomplished the same result in 10 hours.

It will be understood that the invention is not to be limited to the details given herein but that it may be modified within the scope of the appended claims.

The embodiments of the invention in which an exclusive property or privilege is claimed are defined as follows:

1. A process of dissolving neutron bombarded nuclear aluminum-base fuel, comprising immersing said fuel in boiling nitric acid of a concentration of between 0.8 and 1.2 M and containing mercuric ion catalyst in a concentration of between 0.003 and 0.015 M until said fuel assumes a grey color; adding concentrated nitric acid at boiling temperature in a quantity to obtain a concentration of between 4 and 6 M whereupon said fuel is dissolved.

2. The process of claim 1 wherein said concentrated nitric acid is added promptly upon appearance of the grey color on said fuel.

References Cited by the Examiner
UNITED STATES PATENTS 2,901,343   8/1959   Peterson _____ 75—97
3,119,658   1/1964   Schulz _____ 23—102

CARL D. QUARFORTH, *Primary Examiner.*

BENJAMIN R. PADGETT, *Examiner.*